Nov. 18, 1958 M. A. RAUSEO 2,860,674
APPARATUS FOR SHAPING SHEETS OF FLEXIBLE MATERIAL
TO FORM A SHAPED MULTI-PLY ARTICLE
Filed Nov. 19, 1956 3 Sheets-Sheet 2
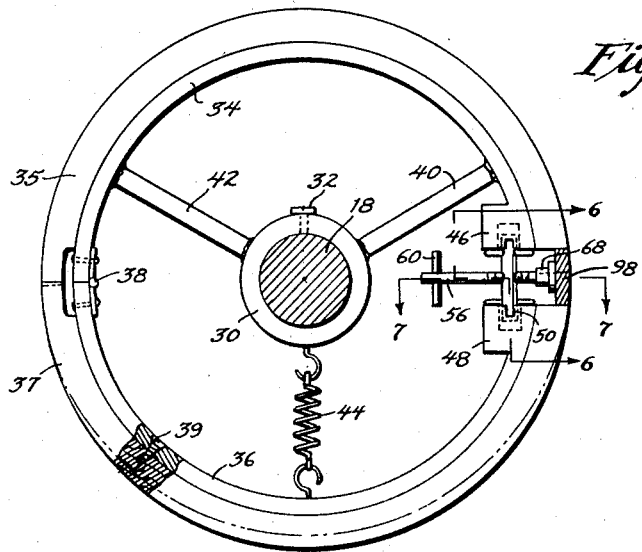
Fig.5.
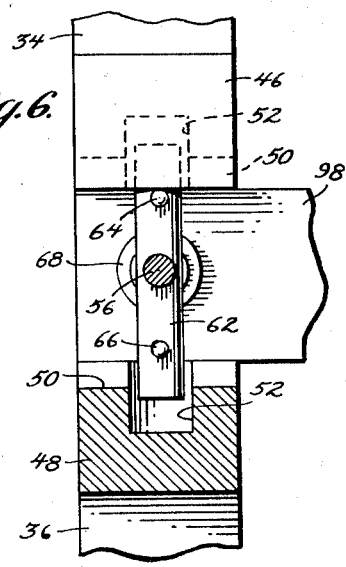
Fig.6.
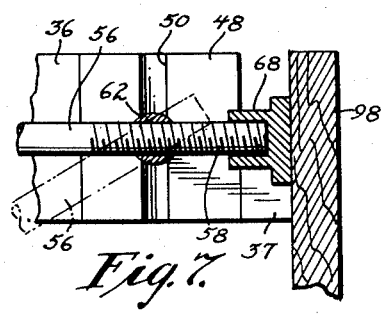
Fig.7.
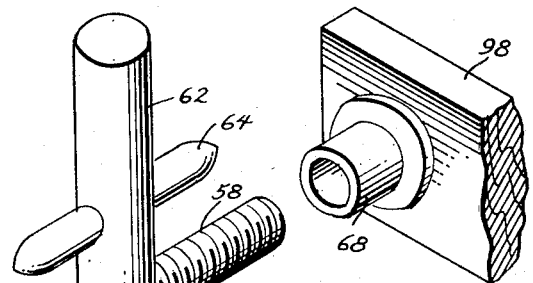
Fig.8.
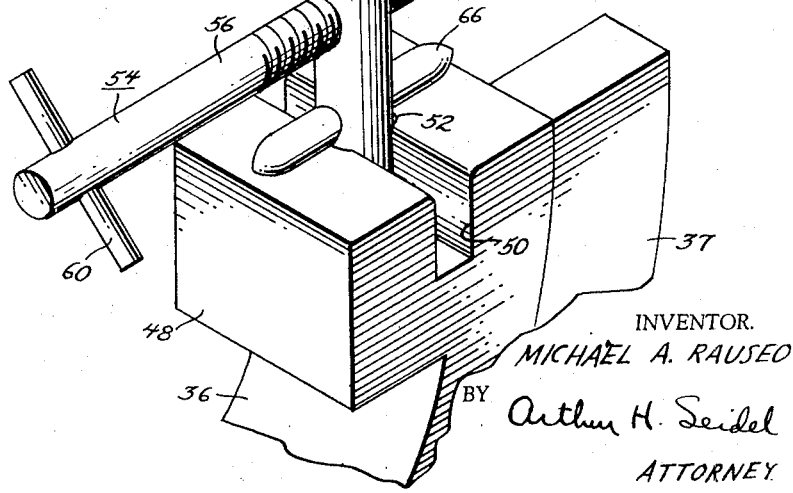
INVENTOR.
MICHAEL A. RAUSEO
BY Arthur H. Seidel
ATTORNEY Nov. 18, 1958 — M. A. RAUSEO — 2,860,674
APPARATUS FOR SHAPING SHEETS OF FLEXIBLE MATERIAL
TO FORM A SHAPED MULTI-PLY ARTICLE
Filed Nov. 19, 1956

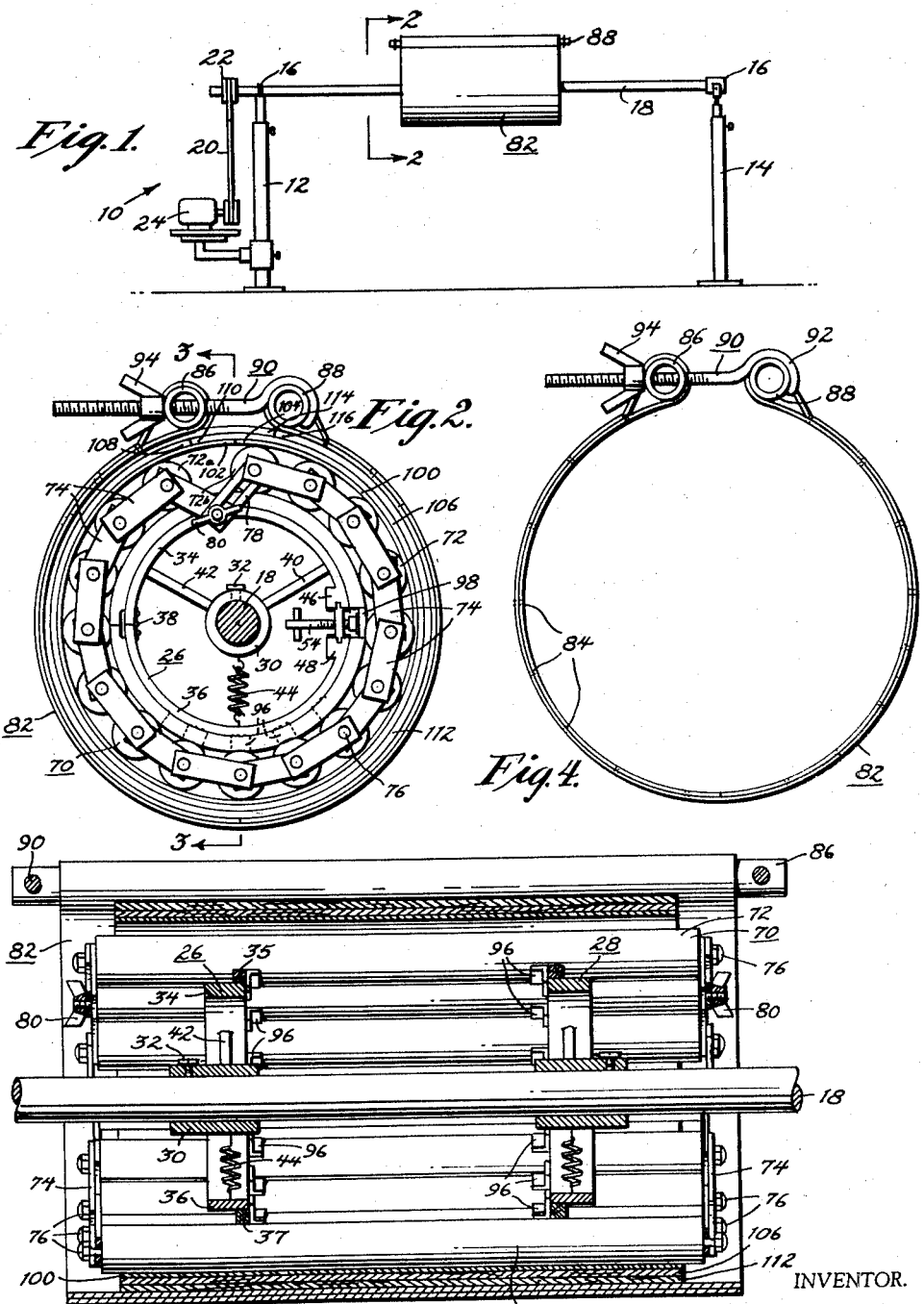

INVENTOR.
MICHAEL A. RAUSEO
BY Arthur H. Seidel
ATTORNEY.

United States Patent Office 2,860,674
Patented Nov. 18, 1958

2,860,674

APPARATUS FOR SHAPING SHEETS OF FLEXIBLE MATERIAL TO FORM A SHAPED MULTI-PLY ARTICLE

Michael A. Rauseo, Philadelphia, Pa.

Application November 19, 1956, Serial No. 622,950

16 Claims. (Cl. 144—265)

The present invention relates to apparatus for shaping sheets of flexible material to form a shaped multi-ply article, and more particularly to apparatus for forming shaped plywood objects, such as plywood cylinders, and objects having elliptical or circular cross-sections.

The subject patent application is a continuation-in-part of my earlier filed copending patent application Serial No. 613,536 filed October 2, 1956 entitled, "Apparatus for Shaping Sheets of Flexible Material To Form a Shaped Multi-Ply Article."

In my earlier filed copending patent application, I disclosed an apparatus capable of producing shaped multi-ply articles in a wide variety of shapes. As more fully set forth therein, such apparatus had utility both in the custom production of small runs of shaped articles, or single shaped articles, and in the assembly of large numbers of shaped articles. The subject invention, however, is primarily directed to an improvement of the invention forming the subject matter of Serial No. 613,536, enabling such invention to be used more readily for the mass production of desired shaped multi-ply articles.

The present invention has as an object the provision of apparatus suitable for the formation of shaped multi-ply articles having curved contours, as by way of example the formation of shaped multi-ply articles of circular or elliptical cross-section.

The present invention has as another object the provision of apparatus for shaping sheets of flexible material to form a shaped multi-ply article in which mass production of the multi-ply articles is possible.

The present invention has as yet another object the provision of apparatus for shaping sheets of flexible material to form a shaped multi-ply article in which the apparatus is of relatively simple and cheap construction, and can be successfully operated by relatively unskilled labor.

For the purpose of illustrating the invention there is shown in the drawings forms which are presently preferred; it being understood, however, that this invention is not limited to the precise arrangements and instrumentalities shown.

Referring to the drawings, wherein like reference characters refer to like parts:

Figure 1 is a side elevational view of the apparatus of the present invention.

Figure 2 is an end elevational view taken on line 2—2 of Figure 1.

Figure 3 is a cross-sectional view taken on line 3—3 of Figure 2.

Figure 4 is an end elevational view of the blanket used in the apparatus of the present invention.

Figure 5 is an end elevational view of a significant part of the embodiment of the present invention shown in Figure 2, partly in section to reveal constructional detail.

Figure 6 is a view taken on line 6—6 of Figure 5.

Figure 7 is a view taken on line 7—7 of Figure 5.

Figure 8 is an exploded perspective view of the spacer means for releasably maintaining the rims in distended disposition.

Figure 9:
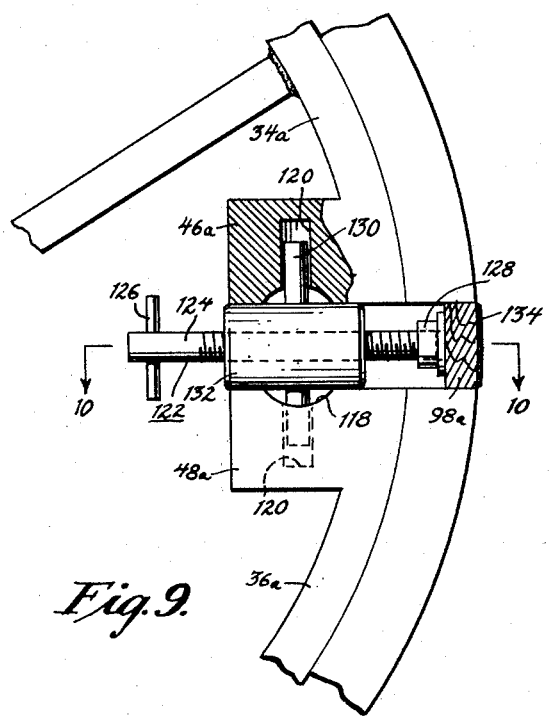
Figure 9 is a fragmentary elevational view of another embodiment of the present invention.
Figure 12:
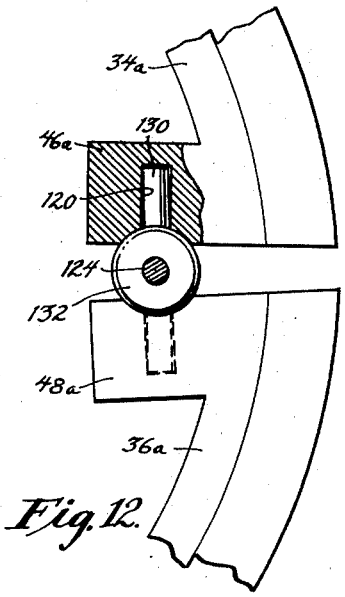
Figure 12 is a fragmentary elevational view partly broken away and partly in section and generally at right angles to Figure 10.
Figure 10:
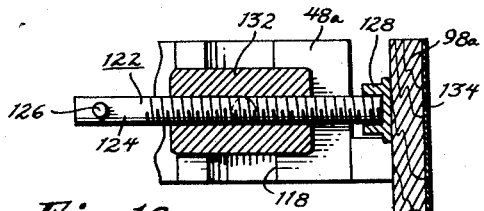
Figure 10 is a view taken on line 10—10 of Figure 9.

Referring to the drawings and initially to Figures 1 through 8 inclusive, the apparatus of the present invention is designated generally by the numeral 10 and comprises a pair of telescopic uprights 12 and 14 having bearings 16 at their uppermost end.

An axle 18 is carried on bearings 16. The axle 18 may be rotated by means of belt 20 which engages a pulley 22 at one end of the axle 18. The belt 20 is driven by electric motor 24 which is carried on the upright 12.

The apparatus of the present invention comprises a pair of extender means designated generally as 26 and 28 which are mounted at spaced distances on axle 18. Inasmuch as extender means 26 and extender means 28 are generally identical, the description contained herein will be limited to extender means 26, it being understood that the description is equally applicable to extender means 28.

Extender means 26 is carried on axle 18 by the hub 30 thereof. The hub 30 may be secured to axle 18 by means of setscrew 32.

Extender means 26 includes a pair of rims 34 and 36 formed of metal or the like, and hingedly connected together by means of hinge 38. Outside curved rim liners 35 and 37 of predetermined configuration are joined to rims 34 and 36 by means of screws 39. A pair of rigid spokes 40 and 42 extend intermediate rim 34 and hub 30.

In the illustrated embodiment the apparatus of the present invention is shown in use for preparing plywood cylinders, and accordingly the rims 34 and 36, and their liners 35 and 37, have the contour of virtually a complete circle. The rims 34 and 36 should be formed of metal having sufficient thickness such that each of the rims maintains its arcuate contour. In place of rims having circular configuration, it is, of course, to be understood that rims having other shapes, such as an elliptical configuration may be utilized in the apparatus of the present invention.

A compression spring 44 joins hub 30 to rim 36 and spring-urges the rim 36 inwardly upon its pivot point at hinge 38. The rims 34 and 36, and their liners 35 and 37, do not comprise a complete circle, but instead, the ends 46 and 48 of such rims 34 and 36 opposite the ends thereof which carry hinge 38 are spaced from each other when the rims 34 and 36 are disposed in the form of a circle to provide a gap therebetween.

The ends 46 and 48 are enlarged to form blocks of appreciably greater thickness than the remainder of rims 34 and 36. Each of the ends 46 and 48 is provided with a notch 50 which is generally parallel to the outer surface of the rim in which the notch is positioned. Each notch 50 is provided with an enlarged bore 52 intermediate its ends.

A spacer means designated generally as 54 extends into the gap intermediate the ends 46 and 48. The spacer means 54 comprises a shaft 56 threaded at one end portion 58 and provided with a crosshead 60 at the other unthreaded end portion.

The shaft 56 extends through a bar 62 which is rigidly positioned intermediate the ends of the shaft 56. Preferably, as shown in Figure 8 the shaft 56 extends through bar 62 midway between the ends of bar 62. Bar 62 is provided with a pair of perpendicular pins 64 and 66 having bullet nose shaped ends. The pins 64 and 66 are spaced on bar 62 on either side of shaft 56 and are equidistant from shaft 56. The thickness of pins 64 and 66 is appreciably less than the width of notch 50 in the ends 46 and 48.

A cap flange 68 is threadably engaged with threaded end portion 58 of shaft 56. The cap flange 68 has a diameter somewhat smaller than the gap intermediate the ends 46 and 48 when the same are spaced apart by spacer means 54, namely the cap flange 68 has a smaller diameter than the distance between the outer surfaces of the pins 64 and 66. However, the cap flange 68 occupies an appreciable portion of the gap intermediate ends 46 and 48.

It will be seen from Figures 6, 7 and 8 that the bar 62 of spacer means 54 is received in the bore 52 of each of the ends 46 and 48. The compression spring 44 insures that the bar 62 will remain so-seated. It will also be noted that rotation of the spacer means, as by gripping the cross-head 60 with pliers or a like tool will permit the bar 62 to be rotated ninety degrees until the pins 64 and 66 are aligned with the notches 50 in the ends 46 and 48. This will be followed by the entry of the pins 64 and 66 into the notches 50 of ends 46 and 48 due to the spring-urging of compression spring 44.

A cordon of bars designated generally as 70 surrounds the extender means 26 and 28. The cordon of bars 70 comprises a plurality of trunnions 72 closely spaced in respect to each other, as for example, being one-half inch apart. The trunnions 72 are joined together by a plurality of links 74, each trunnion 72 having a pair of superposed links 74 at each end, with the links 74 being retained on the ends by means of cap nuts 76 which are threaded onto the threaded shafts which extend outwardly from both ends of the trunnions 72.

Accommodation between the trunnions 72 may be had by joining the endmost trunnions 72a and 72b together with a slotted link 78, and using a wingnut 80 to provide selective tightening between the link 74 from trunnion 72a and the slotted link 78 from trunnion 72b.

The apparatus of the present invention also includes a blanket formed of tough flexible fabric, such as canvas or the like, and designated generally as 82. Preferably, the blanket 82 comprises a plurality of plies joined together by longitudinally extending stitches 84, which provide pockets within which metal tubes 86 and 88 may be positioned. As will be noted from Figures 1 and 3 the blanket 82 is longer than the cordon of bars 70 and extends beyond both of the ends of the cordon of bars 70.

Tightening of the blanket 82 is accomplished by the use of hooks 90, one of whihc is provided for each of the ends of tubes 86 and 88. The shaft of each of the hooks 90 is threaded and extends through an oversize opening in tube 86 the hook-shaped end 92 of hook 90 embracing the outside of tube 88. A wing nut 94 is provided on the threaded portion of each of the hooks 90 and engages the outer surface of the tube 86. Accordingly, when the blanket 82 is wrapped about the cordon of bars 70, the blanket 82 may be tightened thereabout by rotating each of the wing nuts 94 on each of the threaded portions of the hooks 90 towards the hook-shaped end 92 of the hooks 90.

Angle iron brackets 96 are provided on a plurality of the trunnions 72 forming the cordon of bars 70 at spaced distances on the outer surfaces of such trunnions. Such angle iron brackets 96 provide for the spacing and location of the extender means 26 and 28.

The operation of the apparatus embodiment of the present invention shown in Figures 1 through 8 inclusive is as follows:

The operation of the apparatus of the present invention will be shown for a cylinder, but as heretofore indicated, it is to be understood that similar techniques may be utilized to make multi-ply articles of other shapes.

The extender means 26 and 28 are first mounted upon axle 18. The extender means 26 and 28 are spaced from each other so that brackets 96 on the trunnions 72 of the cordon of bars 70 overlaps the innermost faces of the extender means 26 and 28. When the extender means 26 and 28 are properly spaced on the axle 18 the set screws 32 are tightened on the axle 18 fixedly securing the extender means 26 and 28 in position. The trunnions 72 are wrapped about the extender means, and the cordon of bars 70 is closed by tightening wing nut 80 in the slot of slotted link 78. The closed cordon of bars 70 assumes the shape of the outside surface of extender means 26 and 28.

The spacer means 54 during the assembly of the cordon of bars 70 about the extender means is disposed in the position shown in Figure 2. In this position, it will be noted that the outermost surface of cap flange 68 is somewhat inward of the outermost surface of the rims 34 and 36. A strip of wood 98 is mounted upon the cap flanges 68 of the extender means 26 and 28 extending therebetween. As seen particularly in Figures 2 and 5, when so mounted the strip of wood 98 has its outermost surface (which may be of arcuate configuration) generally conforming with the outermost surface of the liners 35 and 37 of the rims 34 and 36. In this manner, the cordon of bars 70 rests upon a continuous templet surface on the extender means 26 and 28.

When the cordon of bars 70 has been established, the multi-ply article is formed thereabout by first wrapping a thin ply of material 100, which may be cardboard or the like, about the cordon of bars, and cementing or otherwise securing the abutting ends 102 and 104 together. Precise conformation of the thin ply 100 about the cordon of bars 70 is secured by means of blanket 82, the blanket 82 being wrapped about the ply 100, and tightened until the ply 100 assumes the precise shape of the juxtaposed surface of the cordon of bars 70.

A second ply 106 of relatively large thickness, as for example a ply of wood or the like is then wrapped about ply 100, and tightened thereabout by the use of blanket 82 in the identical fashion heretofore set forth for the tightening of ply 100 about cordon of bars 70. The abutting ends 108 and 110 of second ply 106 are preferably offset from the abutting ends 102 and 104 of ply 100. A portion of the inner face of ply 106 may be coated with cement or other adhesive, which may be set while blanket 82 is wrapped about ply 106. If it is desired that ply 100 serve as a liner within ply 106, then the entire inner surface of ply 106 may be coated with cement or other adhesive. However, if it is desired that ply 100 be removed from within ply 106, then but a minor portion of the inner surface of ply 106 should be coated with adhesive.

After the cement has set between ply 100 and ply 106, the blanket 82 is removed. A third ply 112, which may be a ply of wood or the like is wrapped about ply 106 with its ends 114 and 116 abutting. The blanket 82 may be utilized to secure precise conformation between ply 106 and ply 112. The inner surface of ply 112 may be coated with a cement or other adhesive which is set while blanket 82 embraces ply 112. As seen particularly in Figure 2, the abutting ends 114 and 116 of ply 112 are preferably offset from the ends 108 and 110 of ply 106.

The aforesaid process may be repeated as many times as desired, and as many plies as desired may be superposed one above the other.

When the multi-ply article is formed, and the blanket 82 removed, the extender means 26 and 28 are collapsed in order to provide for facile removal of the article from the cordon of bars 70. The collapse of the extender means 26 and 28 is accomplished by rotating bar 62 until the pins 64 and 66 are received within the notch 50 of the ends 46 and 48 of rims 34 and 36. When this occurs, the rim 36 will move inwardly due to the spring-urging of compression spring 44 (see the phantom position of rim 36 in Figure 5). The trunnions 72 which are pivotable in respect to each other on links 74 will collapse with the extender means 26 and 28 permitting the article to be slipped off the cordon of bars 70.

When the article has been slipped off the cordon of bars 70, the extender means 26 and 28 are again expanded by moving the rims 34 and 36 away from each other and rotating bar 62 so that the pins 64 and 66 are removed out of the notch 50 in each of the ends 46 and 48 and again assume the position shown in Figure 2. The apparatus is then again set for use and a new article may be made. Thus, the subject apparatus may be used for mass production of articles, with each article being formed and removed without disconnecting the trunnions 72 from each other.

While the use of a cordon of bars 70 has been shown, and the use of such cordon of bars 70 is to be preferred, particularly where long articles are to be made, it is to be understood that the plies being shaped may be wrapped directly about the extender means 26 and 28. In particular, where the production of small articles is desired, or where the plies undergoing shaping have a great deal of strength, the cordon of bars 70 may be dispensed with.

In the embodiment of the present invention shown in Figures 9, 10, 11 and 12, the construction of the extender means, cordon of bars, and blanket is identical to the construction shown in the embodiment of Figures 1 to 8. However, in place of the spacer means 54 shown in the embodiment of Figures 1 to 8, and the arrangements at the ends of the rims, the following modifications are made. For the sake of clarity, reference will be had only to the modifications, the remainder of the constructions shown in Figures 9, 10, 11 and 12 being identical to that of Figures 1 to 8.

The rims 34a and 36a are provided with ends 46a and 48a. The ends 46a and 48a are provided with juxtaposed semicircular notches 118 which are generally parallel to the outer surfaces of the rims 34a and 36a.

A bore 120, generally normal to the notches 118 is positioned midway between the ends of the notches 118.

In the embodiment of Figures 9, 10, 11 and 12 the spacer means 122 comprises a threaded shaft 124 having a cross-head 126 at its innermost end and a threaded cap flange 128 at its outermost end. A bar 130 is carried on shaft 124 at right angles to the axis of shaft 124. The bar 130 is received within the bore 120 of the ends 46a and 48a.

A cylindrical collar 132 having rounded edges embraces shaft 124. The diameter of the collar 132 is such as to permit it to be received within the semicircular notch 118 in each of the ends 46a and 48a.

The operation of the embodiment shown in Figures 9, 10, 11 and 12 is generally similar to the operation of the embodiment shown in Figures 1 to 8. Thus, the rims 34a and 36a are in their expanded disposition when the shaft 124 is disposed as shown in Figure 9. Upon rotation of the shaft 124 ninety degrees to the position shown in Figure 12, the rims 34a and 36a will assume their collapsed disposition, as the collar 132 will be received within the semicircular notches 118 of ends 46a and 48a.

The configuration of the collar 132 and the semicircular notches 118 is such that the collar 132 may be readily cammed into and out of the semicircular notches 118 permitting facile collapse and expansion of the rims 34a and 36a.

A further change is shown in the embodiment of Figures 9, 10, 11 and 12, namely the use of a thin strip 134, such as a strip of brown paper or the like detachably mounted upon the strip of wood 98a which is carried upon the cap flange 128. The thin strip 134 serves as an anchor for the first or innermost ply of the article that is being formed. Thus, the abutting ends of the innermost ply may be joined together and also cemented to the thin strip 134. The used of the thin strip 134 permits facile separation thereof from the finished article, after the multi-ply article has been shaped. Pressure sensitive adhesive or other temporary adhesive means may be used to join thin strip 134 to wood strip 98a.

Figure 13:
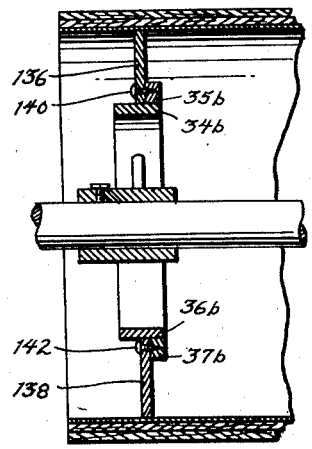
Figure 13 is a cross-sectional view of yet another embodiment of the present invention.
Figure 11:
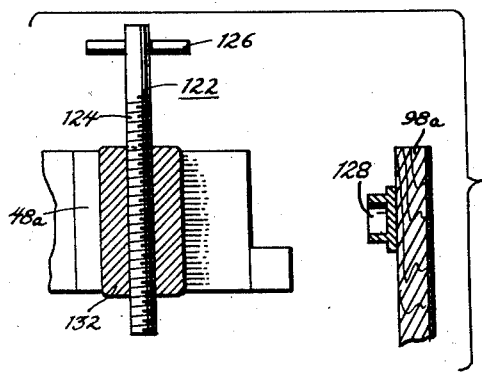
Figure 11 is a fragmentary exploded view showing the operation of the spacer means for releasably maintaining the rims in distended disposition of the embodiment shown in Figure 9.

In the embodiment of the present invention shown in Figure 13, there is shown the use of extenders 136 and 138 affixed to rim liners 35b and 37b of rims 34b and 36b. The extenders 136 and 138 are secured to the sides of rim liners 35b and 37b by means of screws 140 and 142. The use of extenders 136 and 138 permits the sides of the extender means 26 and 28 to be considerably enlarged. Preferably, when extenders, such as extenders 136 and 138 are utilized, a cordon of bars, such as the cordon of bars 70 which has heretofore been described should be disposed about the outer edge of the extenders 136 and 138. However, if desired, the plies of the article being formed may be wrapped directly about the extenders.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for shaping a plurality of plies of flexible material to form a shaped multi-ply article, said apparatus including an axle, a plurality of closely spaced rigid bars disposed about said axle in close side-by-side disposition to each other to form a closed cordon, extender means mounted on said axle and disposed intermediate said axle and said cordon of bars, said extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a plurality of elements, resilient means for urging at least one of said elements toward another of said elements, and spacer means for releasably maintaining each of the elements comprising said extender means in its distendably engaged disposition.

2. Apparatus for shaping a plurality of plies of flexible material to form a shaped multi-ply article, said apparatus including an axle, a plurality of closely spaced rigid bars disposed about said axle in close side-by-side disposition to each other to form a closed cordon, extender means mounted on said axle and disposed intermediate said axle and said cordon of bars, said extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a plurality of elements, resilient means for urging at least one of said elements toward another of said elements, spacer means for releasably maintaining each of the elements comprising said extender means in its distendably engaged disposition, a blanket of flexible material, and means for tightening said blanket about said cordon of bars.

3. Apparatus for shaping a plurality of plies of flexible material to form a shaped multi-ply article, said apparatus including an axle, a plurality of closely spaced rigid bars disposed about said axle in close side-by-side disposition to each other to form a closed cordon, extender means mounted on said axle and disposed intermediate said axle and said cordon of bars, said extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a plurality of movable elements, hinge means for connecting said movable elements together and for pivoting said movable elements from their distendably engaged disposition to a disposition in which said elements are released from engagement with said cordon of bars, resilient means for urging at least one of said elements toward another of said elements, and spacer means for releasably maintaining each of the elements comprising said extender means in its distendably engaged disposition.

4. Apparatus for shaping a plurality of plies of flexible material to form a shaped multi-ply article, said apparatus including an axle, a plurality of closely spaced rigid bars disposed about said axle in close side-by-side disposition to each other to form a closed cordon, a plurality of extender means mounted on said axle and disposed intermediate said axle and said cordon of bars, radially inwardly directed brackets on at least one of the bars of said cordon for engaging with the inner faces of said extender means and maintaining said extender means spaced from each other, said extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a plurality of elements, resilient means for urging at least one of said elements toward another of said elements, and spacer means for releasably maintaining each of the elements comprising said extender means in its distendably engaged disposition.

5. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a pair of rims, hinge means connecting said rims together, a hub removably mounted on said axle, a spoke disposed intermediate the first of said rims and said hub and fixedly secured thereto, spring means connected to the second of said rims for urging said second rim inwardly towards said hub, and spacer means for releasably maintaining said first and second rims in distended disposition.

6. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a pair of rims, hinge means connecting said rims together, a hub removably mounted on said axle, a spoke disposed intermediate the first of said rims and said hub and fixedly secured thereto, spring means connected to the second of said rims for urging said second rim inwardly towards said hub, spacer means for releasably maintaining said first and second rims in distended disposition, a blanket of flexible material, and means for tightening said blanket about said cordon of bars.

7. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, a plurality of extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, radially inwardly directed brackets on at least one of the bars of said cordon for engaging with the inner faces of said extender means and maintaining said extender means spaced from each other, each of said extender means comprising a pair of rims, hinge means connecting said rims together, a hub removably mounted on said axle, a spoke disposed intermediate the first of said rims and said hub and fixedly secured thereto, spring means connected to the second of said rims for urging said second rim inwardly towards said hub, and spacer means for releasably maintaining said first and second rims in distended disposition.

8. Apparatus for shaping a plurality of plies of flexible material to form a shaped multi-ply article, said apparatus including an axle, extender means mounted on said axle and extending outwardly, said extender means comprising a plurality of rims of predetermined outer configuration, hinge means connecting said rims together, resilient means for urging said rims together, and spacer means for releasably maintaining said rims in a predetermined distended disposition with said last-mentioned means including a projection extending intermediate said rims, said projection having a free end generally conforming with the outermost surfaces of said rims.

9. Apparatus for shaping a plurality of plies of flexible material to form a shaped multi-ply article, said apparatus including an axle, extender means removably mounted on said axle and extending outwardly, said extender means comprising a plurality of rims of predetermined outer configuration, hinge means connecting said rims together, a hub embracing said axle, a spoke disposed intermediate the first of said rims and said hub and fixedly secured thereto, spring means connected to the second of said rims for urging said second rim inwardly towards said hub, and spacer means for releasably maintaining said first and second rims in distended disposition, with said spacer means including a projection extending intermediate said rims, said projection having a free end generally conforming with the outermost surfaces of said rims.

10. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a pair of rims, hinge means connecting said rims together, a hub removably mounted on said axle, a spoke disposed intermediate the first of said rims and said hub and fixedly secured thereto, spring means connected to the second of said rims for urging said second rim inwardly towards said hub, spacer means for releasably maintaining said first and second rims in distended disposition, said spacer means including a member extending intermediate a gap between said rims, and a rigid element supported on said last-mentioned member and extending generally parallel to the bars forming the cordon.

11. Apparatus for shaping a plurality of plies of flexible material to form a shaped multi-ply article, said apparatus including an axle, extender means removably mounted on said axle and extending outwardly, said extender means comprising a plurality of rims of predetermined outer configuration, hinge means connecting said rims together, a hub embracing said axle, a spoke disposed intermediate the first of said rims and said hub and fixedly secured thereto, spring means connected to the second of said rims for urging said second rim inwardly towards said hub, spacer means for releasably maintaining said first and second rims in distended disposition, and said spacer means including a member extending intermediate a gap between said rims, with said member having a free end generally conforming with the outermost surfaces of said rims.

12. Apparatus for shaping a plurality of plies of flexible material to form a shaped multi-ply article, said apparatus including an axle, a plurality of closely spaced rigid bars disposed about said axle in close side-by-side disposition to each other to form a closed cordon, extender means mounted on said axle and disposed intermediate said axle and said cordon of bars, said extender means having a shaped outer edge of predetermined configuration juxtaposed to the inner surface of said cordon of bars, said extender means being distendably engaged with said cordon of bars with said cordon of bars being operatively disposed along the shaped outer edge of said extender means in conformity with the shape of said outer edge, said extender means comprising a plurality of elements and spacer means for releasably maintaining each of the elements comprising said extender means in its distendably engaged disposition, with said spacer means including a projection extending intermediate said rims, said projection having a free end generally conforming with the outermost surfaces of said rims.

13. Apparatus for shaping a plurality of plies of flexible material to form a shaped multi-ply article, said apparatus including an axle, extender means mounted on said axle and extending outwardly, said extender means comprising a plurality of rims of predetermined outer configuration, hinge means connecting said rims together whereby said rims may be pivoted between distended and collapsed dispositions, resilient means for urging said rims together, and spacer means for releasably maintaining said rims in a predetermined distended disposition, said spacer means including a rotatable member extending intermediate a gap between said rims, the ends of the rims adjacent said rotatable member having notches, a rigid element on said rotatable member, said rigid element being received within the notches on the ends of said rims when said rims are in collapsed disposition and said rigid element being disposed outside of said notches when said rims are in distended disposition.

14. Apparatus for shaping a plurality of plies of flexible material to form a shaped multi-ply article, said apparatus including an axle, extender means mounted on said axle and extending outwardly, said extender means comprising a plurality of rims of predetermined outer configuration, hinge means connecting said rims together whereby said rims may be pivoted between distended and collapsed dispositions, resilient means for urging said rims together, and spacer means for releasably maintaining said rims in a predetermined distended disposition, said spacer means including a rotatable member extending intermediate a gap between said rims, the ends of the rims defining said gap being notched, a rigid element supported on said rotatable member said rigid element being received within the notches on the ends of said rims when said rims are in collapsed disposition and said rigid element being disposed outside of said notches when said rims are in distended disposition, and a cap on the end of said rotatable member for occupying the gap between said rims when said rims are in distended disposition.

15. Apparatus for shaping a plurality of plies of flexible material to form a shaped multi-ply article, said apparatus including an axle, extender means removably mounted on said axle and extending outwardly, said extender means comprising a plurality of rims of predetermined outer configuration, hinge means connecting said rims together whereby said rims may be pivoted between distended and collapsed dispositions, a hub embracing said axle, a spoke disposed intermediate the first of said rims and said hub and fixedly secured thereto, spring means connected to the second of said rims for urging said second rim inwardly towards said hub, and spacer means for releasably maintaining said first and second rims in distended disposition, said spacer means including a rotatable member extending intermediate a gap between said rims, the ends of the rims defining said gap being notched, a rigid element supported on said rotatable member said rigid element being received within the notches on the ends of said rims when said rims are in collapsed disposition and said rigid element being disposed outside of said notches when said rims are in distended disposition.

16. Apparatus for shaping a plurality of plies of flexible material to form a shaped multi-ply article, said apparatus including an axle, extender means removably mounted on said axle and extending outwardly, said extender means comprising a plurality of rims of predetermined outer configuration, hinge means connecting said rims together whereby said rims may be pivoted between distended and collapsed disposition, a hub embracing said axle, a spoke disposed intermediate the first of said rims and said hub and fixedly secured thereto, spring means connected to the second of said rims for urging said second rim inwardly towards said hub, and spacer means for releasably maintaining said first and second rims in distended disposition, said spacer means including a rotatable member extending intermediate a gap between said rims, the ends of the rims defining said gap being notched, a rigid element supported on said rotatable member said rigid element being received within the notches on the ends of said rims when said rims are in collapsed disposition and said rigid element being disposed outside of said notches when said rims are in distended disposition, and a cap on the end of said rotatable member for occupying the gap between said rims when said rims are in distended disposition.

References Cited in the file of this patent

UNITED STATES PATENTS

| 744,876 | Ott | Nov. 24, 1903 |
|---|---|---|
| 1,022,970 | Ott | Apr. 9, 1912 |
| 1,460,460 | Walker | July 3, 1923 |
| 2,000,544 | Winchell | May 7, 1935 |
| 2,090,415 | Homey | Aug. 17, 1937 |

FOREIGN PATENTS

| 673,580 | Great Britain | June 11, 1952 |
|---|---|---|